United States Patent
Avis et al.

(10) Patent No.: US 10,711,644 B2
(45) Date of Patent: Jul. 14, 2020

(54) METHOD AND SYSTEM TO ENSURE FULL OIL TUBES AFTER GAS TURBINE ENGINE SHUTDOWN

(71) Applicant: United Technologies Corporation, Farmington, CT (US)

(72) Inventors: Thomas Bruce Avis, Manchester, CT (US); Francis Parnin, Suffield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 463 days.

(21) Appl. No.: 15/495,639

(22) Filed: Apr. 24, 2017

(65) Prior Publication Data

US 2018/0306062 A1    Oct. 25, 2018

(51) Int. Cl.
| | |
|---|---|
| F01D 25/20 | (2006.01) |
| F01M 1/02 | (2006.01) |
| F16N 29/02 | (2006.01) |
| F16N 7/02 | (2006.01) |

(Continued)

(52) U.S. Cl.
CPC ............... *F01D 25/20* (2013.01); *F01M 1/02* (2013.01); *F01M 1/12* (2013.01); *F16N 7/02* (2013.01); *F16N 7/40* (2013.01); *F16N 29/02* (2013.01); *F05D 2260/98* (2013.01);
(Continued)

(58) Field of Classification Search
CPC ........ F01D 25/20; F01M 1/02; F05D 2260/98
See application file for complete search history.

(56) References Cited

U.S. PATENT DOCUMENTS

| | | | | |
|---|---|---|---|---|
| 3,147,821 A | * | 9/1964 | Eggenberger | ........... F01D 21/14 184/109 |
| 6,463,819 B1 | * | 10/2002 | Rago | ..................... B64D 37/22 137/112 |
| 7,174,997 B2 | | 2/2007 | Sheridan | |

(Continued)

FOREIGN PATENT DOCUMENTS

| | | |
|---|---|---|
| EP | 1510658 A2 | 3/2005 |
| EP | 1731719 A1 | 12/2006 |

(Continued)

OTHER PUBLICATIONS

European Search Report for European Application No. 18169099.1 dated Nov. 21, 2018.

*Primary Examiner* — Michael R Mansen
*Assistant Examiner* — Mark K Buse
(74) *Attorney, Agent, or Firm* — Carlson, Gaskey & Olds, P.C.

(57) ABSTRACT

A gas turbine engine includes a bearing compartment that has an inlet. A supply line splits into a supply conduit and a reservoir conduit that are fluidly parallel to one another for a length. The reservoir conduit fluidly rejoins the supply conduit at a junction. The supply conduit is fluidly connected to the inlet, and the reservoir conduit includes a flow restrictor upstream from the junction. A main pump is fluidly connected to the supply line and is configured to supply a lubricant to the bearing compartment through the supply line and supply and reservoir conduits in an operating state. The main pump has a non-operating state in which the reservoir conduit is configured to slowly refill the supply conduit through the flow restrictor.

13 Claims, 4 Drawing Sheets

(51) Int. Cl.
*F16N 7/40* (2006.01)
*F01M 1/12* (2006.01)

(52) U.S. Cl.
CPC ...... *F16N 2210/02* (2013.01); *F16N 2210/14* (2013.01); *F16N 2260/06* (2013.01); *Y02T 50/675* (2013.01)

(56) References Cited

U.S. PATENT DOCUMENTS

| | | | |
|---|---|---|---|
| 7,878,302 B2 | 2/2011 | Smith | |
| 2005/0034924 A1* | 2/2005 | James | F01D 21/14 184/6.4 |
| 2006/0075754 A1* | 4/2006 | Champion | F01D 25/20 60/772 |
| 2007/0137932 A1* | 6/2007 | Smith | F01D 25/18 184/6 |
| 2016/0215652 A1* | 7/2016 | Mastro | F01D 25/20 |
| 2016/0305284 A1* | 10/2016 | Mastro | F01D 25/20 |
| 2017/0114662 A1* | 4/2017 | Mastro | F01D 25/20 |
| 2017/0350274 A1* | 12/2017 | Snyder | F01D 25/18 |
| 2018/0066552 A1* | 3/2018 | Waddleton | F01M 11/03 |
| 2018/0073395 A1* | 3/2018 | Parnin | F01D 15/12 |
| 2018/0230854 A1* | 8/2018 | Parnin | F01D 25/18 |
| 2018/0283211 A1* | 10/2018 | Parnin | F01D 19/00 |

FOREIGN PATENT DOCUMENTS

| | | |
|---|---|---|
| EP | 1647675 | 11/2012 |
| EP | 3255255 A1 | 12/2017 |
| GB | 2133481 A | 7/1984 |

* cited by examiner

METHOD AND SYSTEM TO ENSURE FULL OIL TUBES AFTER GAS TURBINE ENGINE SHUTDOWN

BACKGROUND

This disclosure relates to a lubrication system for gas turbine engines and more particularly to a configuration for overcoming oil coking in the lubrication system.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines. High and low spools or shafts respectively support the high pressure and low pressure turbines and compressors.

The engine has bearings that support the high and low shafts. The bearings are typically housed in bearing compartments that are connected to a lubrication system. The lubrication system provides lubricant, such as oil, to the bearing compartment through a supply line to lubricate and cool the bearings. The lubrication system also recovers the oil from the bearing compartment through a scavenge line and sends the oil through a filter and heat exchanger before cycling the oil back to the bearing compartment.

At shutdown of the gas turbine engine, the lubrication system ceases to circulate oil to the bearing compartment and the oil, now without pumping pressure, drains out of both the supply line and the scavenge line and back to a sump or low point in the lubrication system. With the lubrication system inactive and no longer dissipating heat from the bearing compartment, heat produced by the gas turbine engine just prior to shutdown can "soak" into both the bearing compartment and the supply and scavenge lines and can excessively elevate the temperature of these engine components. The elevated temperatures caused by the heat soak back can cause oil mist or film located in the supply and scavenge lines to react with air and form coke deposits on the inside surfaces of the supply and scavenge lines. Over time, these coke deposits can accumulate and clog the tubes preventing oil from flowing to the bearing compartment. Without an adequate supply of oil, the bearings in the bearing compartment can fail and result in engine-wide failure of the gas turbine engine.

SUMMARY

In one exemplary embodiment, a gas turbine engine includes a bearing compartment that has an inlet. A supply line splits into a supply conduit and a reservoir conduit that are fluidly parallel to one another for a length. The reservoir conduit fluidly rejoins the supply conduit at a junction. The supply conduit is fluidly connected to the inlet and the reservoir conduit includes a flow restrictor upstream from the junction. A main pump is fluidly connected to the supply line and is configured to supply a lubricant to the bearing compartment through the supply line and supply and reservoir conduits in an operating state. The main pump has a non-operating state in which the reservoir conduit is configured to slowly refill the supply conduit through the flow restrictor.

In a further embodiment of any of the above, there is a reservoir and a scavenger pump. The bearing compartment includes an outlet. The scavenger pump is fluidly connected to the reservoir and the outlet respectively by a return line and a scavenge line.

In a further embodiment of any of the above, the inlet and the outlet are respectively provided on high and low pressure sides. A pressure differential between the high and low pressure sides is configured to evacuate the supply conduit with the main pump in the non-operating state.

In a further embodiment of any of the above, an anti-siphon line is fluidly interconnected to the supply line and the reservoir. A flow restriction separates the anti-siphon line from the supply line.

In a further embodiment of any of the above, the supply conduit includes a U-shaped portion gravitationally below the junction in a normal engine operating condition.

In a further embodiment of any of the above, the U-shaped portion includes a flow meter downstream from the junction.

In a further embodiment of any of the above, the U-shaped portion is gravitationally below the bearing compartment in the normal engine operating condition.

In a further embodiment of any of the above, the U-shaped portion includes legs that are filled by the reservoir conduit with the main pump in the non-operating condition.

In a further embodiment of any of the above, the reservoir conduit is gravitationally above the junction in the normal engine operating condition.

In a further embodiment of any of the above, the supply split into the supply and reservoir conduits is gravitationally above the junction in the normal engine operating condition.

In a further embodiment of any of the above, the main pump is gravitationally below the U-shaped portion and the reservoir in the normal engine operating condition.

In a further embodiment of any of the above, the bearing compartment is a first bearing compartment. The inlet is a first inlet. The supply and reservoir conduits are first supply and reservoir conduits. The length is a first length and the junction is a first junction. The flow restrictor is a first flow restrictor. A second bearing compartment has a second inlet. The supply line splits into a second supply conduit and a second reservoir conduit that are fluidly parallel to one another for a second length. The second reservoir conduit fluidly rejoins the second supply conduit at a second junction. The second supply conduit is fluidly connected to the second inlet. The second reservoir conduit includes a second flow restrictor upstream from the second junction. A main pump is configured to supply a lubricant to the second bearing compartment through the supply line and second supply and reservoir conduits in an operating state. The second reservoir conduit is configured to slowly refill the second supply conduit through the second flow restrictor with the main pump in the non-operating state.

In another exemplary embodiment, a method of operating a lubrication system for a gas turbine engine includes pumping a lubricant from a supply conduit to a bearing compartment. A pressure differential is created in the bearing compartment. The supply conduit is evacuated in response to the pressure differential creating step. The supply conduit is refilled with the lubricant from a reservoir conduit fluidly joined to the supply conduit at a junction by gravitationally draining the reservoir conduit.

In a further embodiment of any of the above, the lubrication system includes a main pump fluidly connected to the bearing compartment by a supply line. The pumping step includes providing lubricant to the bearing compartment through a supply line that splits into the supply conduit and the reservoir conduit that are fluidly parallel to one another for a length before rejoining with one another at the junction.

In a further embodiment of any of the above, the reservoir conduit includes a flow restrictor upstream from the junction. The refilling step includes filling the supply conduit through the flow restrictor more slowly that the lubricant is evacuated from the supply conduit.

In a further embodiment of any of the above, the supply conduit includes a U-shaped portion gravitationally below the junction and the bearing compartment in a normal engine operating condition. The U-shaped portion includes the flow meter downstream from the junction.

In a further embodiment of any of the above, the U-shaped portion includes legs and the refilling step includes filling the legs.

In a further embodiment of any of the above, the method includes scavenging the lubricant from the bearing compartment while simultaneously performing the pumping step. The scavenging step including returning the lubricant to a reservoir.

In a further embodiment of any of the above, the pumping step includes pumping the lubricant to at least two bearing compartments.

In another exemplary embodiment, a gas turbine engine includes a bearing compartment that has an inlet and an outlet. There is a reservoir. A supply line splits into a supply conduit and a reservoir conduit that are fluidly parallel to one another for a length. The reservoir conduit fluidly rejoins the supply conduit at a junction. The supply conduit is fluidly connected to the inlet. The reservoir conduit includes a flow restrictor upstream from the junction. An anti-siphon line is fluidly interconnected to the supply line and the reservoir. A flow restriction separates the anti-siphon line from the supply line. A main pump is fluidly connected to the supply line and is configured to supply a lubricant to the bearing compartment through the supply line and supply and reservoir conduits in an operating state. The main pump has a non-operating state in which the reservoir conduit is configured to slowly refill the supply conduit through the flow restrictor. The inlet and the outlet are respectively provided on high and low pressure sides. A pressure differential between the high and low pressure sides is configured to evacuate the supply conduit with the main pump in the non-operating state. A scavenger pump is fluidly connected to the reservoir and the outlet respectively by a return line and a scavenge line. The supply conduit includes a U-shaped portion gravitationally below the junction in a normal engine operating condition. The U-shaped portion includes a flow meter downstream from the junction. The U-shaped portion is gravitationally below the bearing compartment in the normal engine operating condition. The U-shaped portion includes legs that are filled by the reservoir conduit with the main pump in the non-operating condition. The reservoir conduit is gravitationally above the junction in the normal engine operating condition. The supply is split into the supply and reservoir conduits that is gravitationally above the junction in the normal engine operating condition. The main pump is gravitationally below the U-shaped portion and the reservoir in the normal engine operating condition.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
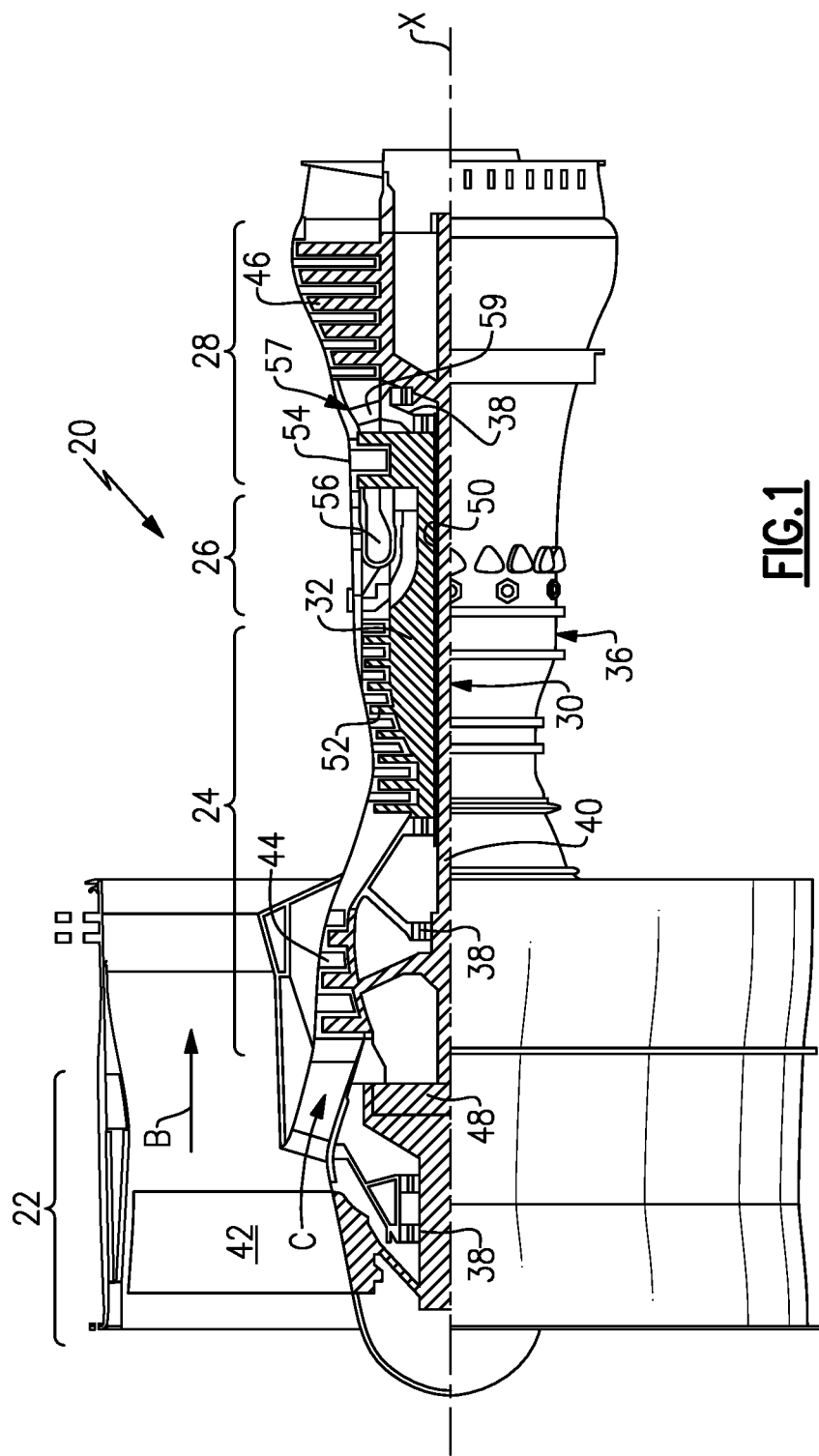
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 2:
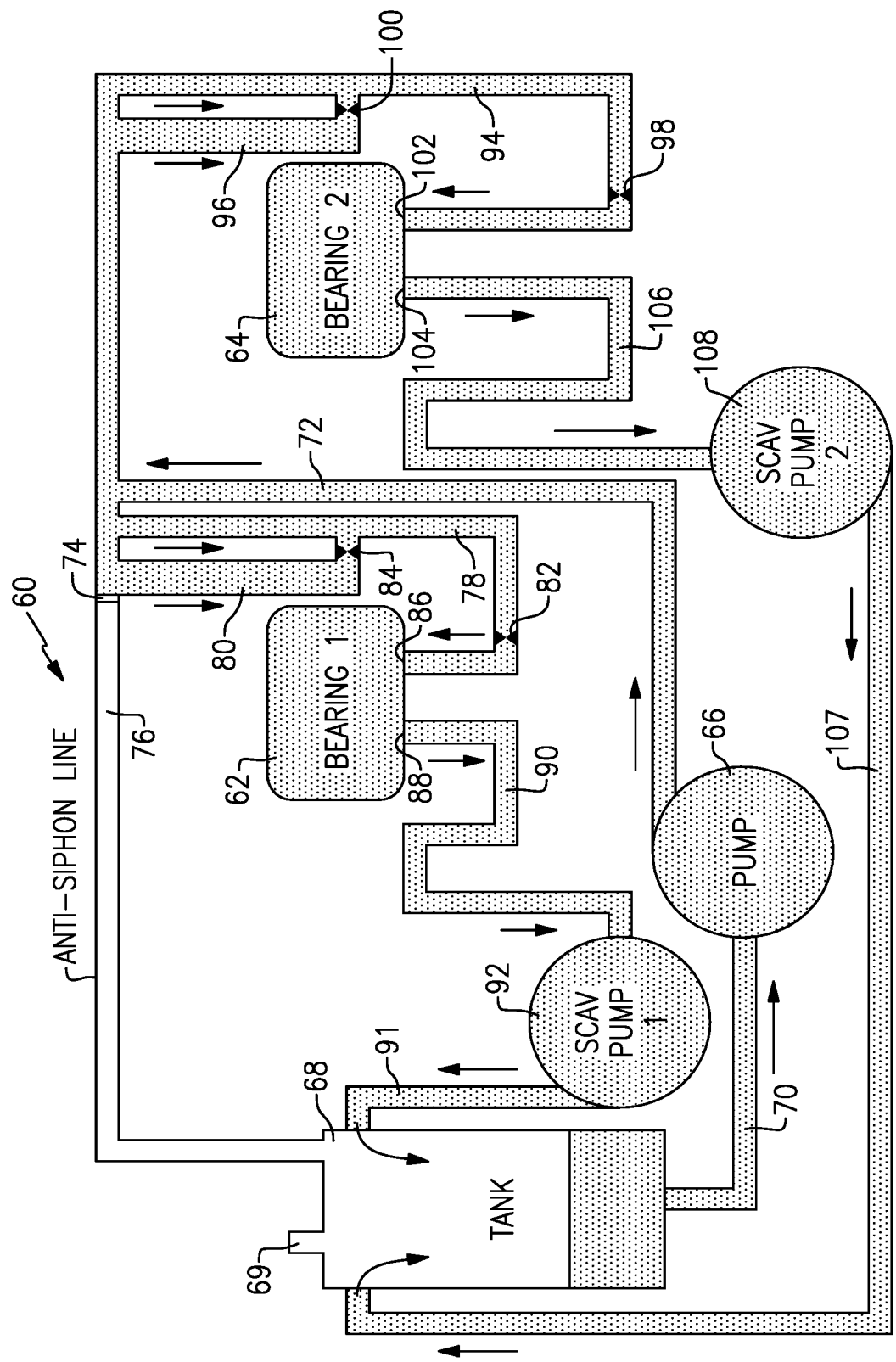
FIG. 2 is a lubrication system schematic with fluid pumps operational in an operating state.

Referring to FIG. 2, a lubrication system 60 is schematically shown with the relative position of its components positioned gravitationally with respect to one another as if in a normal engine operating condition in which an aircraft travels along a horizontal flight path with respect to the Earth's horizon. In the example, the lubrication system 60 includes first and second bearing compartments 62, 64. In one example, the first bearing compartment housing a bearing that corresponds to the #4 bearing, which supports an aft portion of the high spool 50. The second bearing compartment 64 houses the #5 and #6 bearings that support an aft portion of low spool 40 with respect to a turbine exhaust case.

Figure 3:
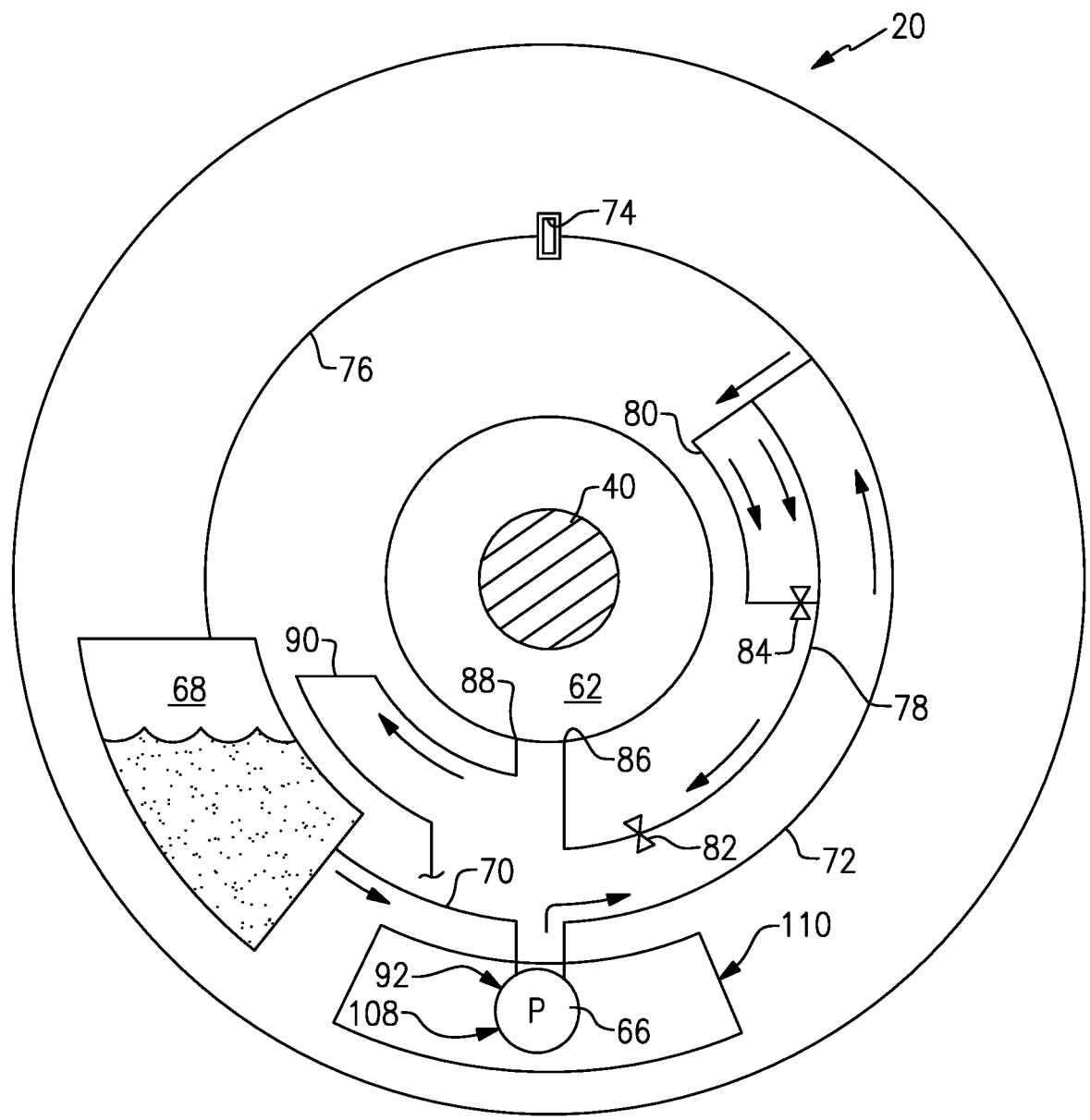
FIG. 3 is a schematic end view of portions of the lubrication system shown in FIG. 2 in relation to the gas turbine engine of FIG. 1.

Referring to FIG. 3, an accessory drive gearbox 110 is rotationally driven by one of the spools, for example, the high spool 50, via a tower shaft (not shown). One or more pumps (e.g., main pump 66 and first and second scavenge pumps 92, 108) is mounted to the accessory drive gearbox 110 where the pumps are rotationally driven during engine operation in an operating state. In response to an engine shutdown procedure, rotation of the pumps cease which stops circulation of lubricant to the first and second bearing compartment 62, 64.

Returning to FIG. 2, the main pump 66 is fluidly connected to a reservoir 68 by a feed line 70. The main pump 66, when in the operating state, draws lubricant from the reservoir 68 through the feed line 70 and supplies the lubricant to the first and second bearing compartment 62, 64 through a supply line 72. An anti-siphon line 76 fluidly connects the supply line 72 at a flow restriction 74 to a top of the reservoir 68. The reservoir 68 may also include a vent 69. The flow restriction 74 may permit a small amount of fluid to leak from the supply line 72 into the anti-siphon line 76 during the operating state.

Each of the first and second bearing compartments 62, 64 includes a fluid circuit. Beginning with the first bearing compartment 62, the supply line 72 splits into a first supply conduit 78 and first reservoir conduit 80 that are fluidly parallel to one another for a length. The first reservoir conduit 80 fluidly rejoins the first supply conduit 78 at a junction. The first supply conduit 78, which has a U-shape downstream from the junction is fluidly connected to the first bearing compartment 62 at a first inlet 86.

A first flow meter 82 is provided in the U-shape portion of the first supply conduit 78 downstream from the junction. The first flow meter 82 balances the fluid flow rate delivered to the first bearing compartment 62 with respect to the second bearing compartment 64. A first flow restrictor 84 is arranged in the first reservoir conduit 80 upstream from the junction.

The first bearing compartment 62 includes a first outlet 88. The first scavenge pump 92 is fluidly connected to the first outlet 88 by a first scavenge line 90 and to the reservoir 68 by first return line 91.

The first supply conduit 78 includes a U-shaped portion gravitationally below the junction and the bearing compartment 62 in the normal engine operating condition. The U-shaped portion has the first flow meter 82 arranged downstream from the junction. The first reservoir conduit 80 is gravitationally above the junction in the normal engine operating condition, and the supply split into the first supply and first reservoir conduits 78, 80 is gravitationally above the junction in the normal engine operating condition. The main pump 66 is gravitationally below the U-shaped portion and the reservoir 68 in the normal engine operating condition. These relative gravitational positions better retain lubricant in the fluid passages to avoid coking.

The second bearing compartment 64 and its associated fluid circuit is configured similarly to the first bearing compartment 62 and its associated fluid circuit. The supply line 72 splits into a second supply conduit 94 and second reservoir conduit 96 that are fluidly parallel to one another for a length. The second reservoir conduit 96 fluidly rejoins the first supply conduit 94 at a junction. The second supply conduit 94, which has a U-shape downstream from the junction is fluidly connected to the second bearing compartment 64 at second inlet 102.

A second flow meter 98 is provided in the U-shape portion of the second supply conduit 94 downstream from the junction. The second flow meter 98 balances the fluid flow rate delivered to the second bearing compartment 64 with respect to the first bearing compartment 62. A second flow restrictor 100 is arranged in the second reservoir conduit 96 upstream from the junction.

The second bearing compartment 64 includes a second outlet 104. The second scavenge pump 108 is fluidly connected to the second outlet 104 by a second scavenge line 106 and to the reservoir 68 by second return line 107, which is separate and discrete from the first return line 91 in the example. The relative gravitational positions of the components associated with the second bearing compartment 64 are similar to those associated with the first bearing compartment 62.

Figure 4:
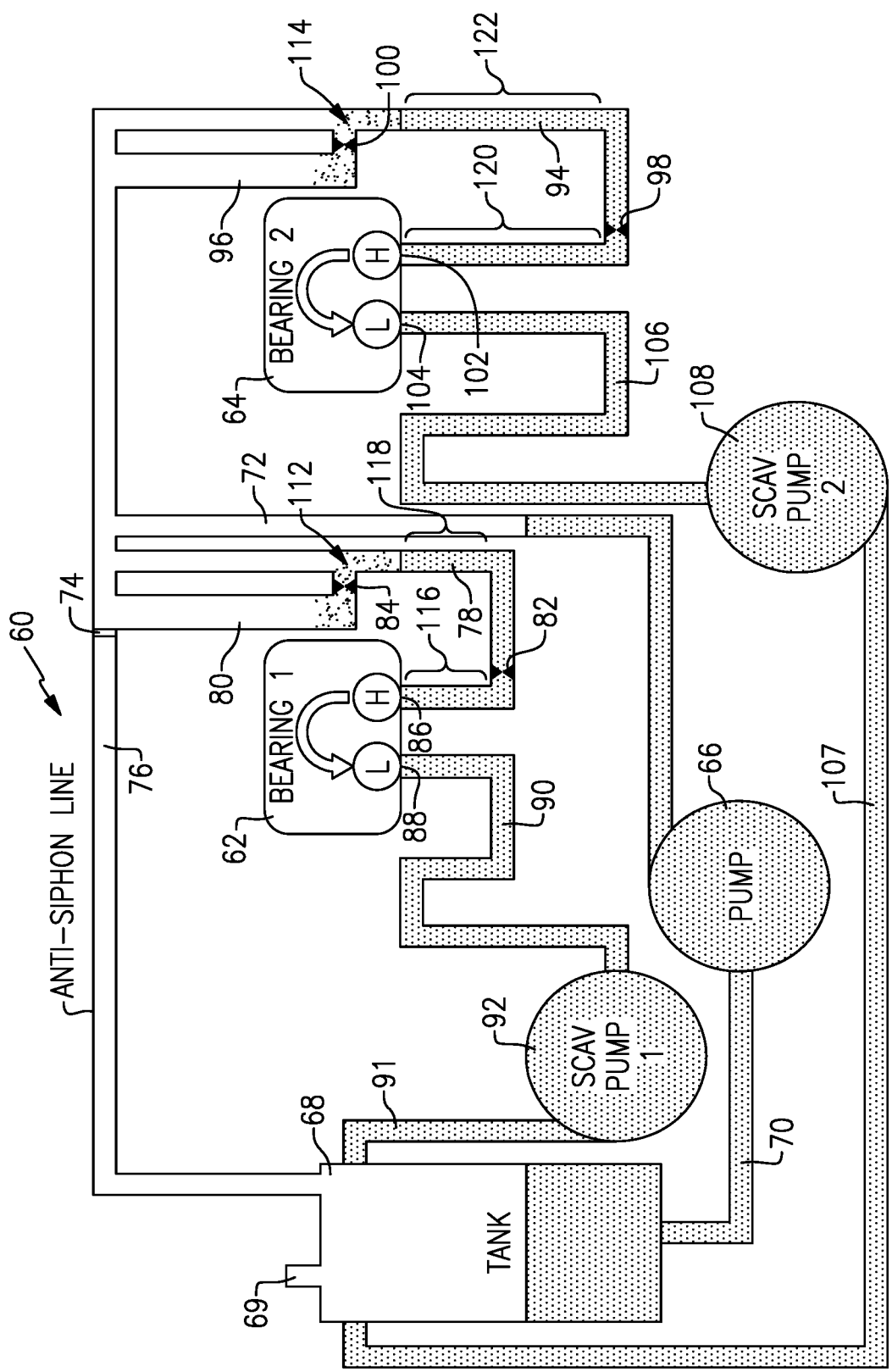
FIG. 4 is the lubrication system schematic shown in FIG. 2, but with the fluid pumps off and in a non-operating state.

As shown in FIG. 2, during the operating state of the main pump 66, the supply side and scavenge side fluid lines and conduits are full of lubricant. Following an engine shutdown procedure, the main pump 66 is off and in a non-operating state. FIG. 4 illustrates the location of lubricant within the lubrication 60 following engine shutdown. The inlets 86, 102 and outlets 88, 104 respectively provide high H and low L pressure sides, creating a pressure differential across each of the first and second bearing compartments 62, 64. This pressure differential evacuates lubricant from the U-shaped portion of the first and second supply conduit 78, 94 such that first conduit portions 116, 118 and second conduit portions 120, 122 would otherwise be emptied of lubricant making these passages more susceptible to coking during a heat soak. To this end, each of the first and second reservoir conduits 80, 96 slowly refill the legs of the U-shaped portions of the first and second supply conduits 78, 94 respectively through their first and second flow restrictors 84, 100, which prevents rapid filling of the supply conduits that would result in the supply conduits being immediately evacuated of the lubricant before the pressure differential has dissipated via air leakage from the anti-siphon feature through the supply conduit into the bearing compartment.

The disclosed method of operating the lubrication system 60 includes pumping a lubricant from a supply conduit to a bearing compartment. A pressure differential is created in the bearing compartment by ceasing the pumping of the lubricant to the bearing compartment. The supply conduit is evacuated in response to the pressure differential creating step. The supply conduit is refilled with the lubricant from a reservoir conduit fluidly joined to the supply conduit at a junction by gravitationally draining the reservoir conduit.

The disclosed lubrication system is configured such that lubricant does not drain out of the supply conduit back toward the scavenge pumps by more slowly refilling the supply conduits with the reservoir conduits than lubricant is able to be evacuate from the supply conduit. In this manner, the differential pressure is broken using the parallel reservoir conduit that has a small orifice provided by the flow restrictor at its gravitational low point. The differential pressure is broken by air flow through main supply conduit into the bearing compartment. By placing the reservoir in parallel with a restrictor between it and the main supply conduit, the air can flow from the anti-siphon feature through the main conduit and into the bearing compartment without affecting the volume of oil in the reservoir. The reservoir can then drain into the main supply conduit, replenishing the oil volume that was forced into the bearing compartment as the anti-siphon air acted to break the pressure differential.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
a bearing compartment having an inlet;
a supply line that splits into a supply conduit and a reservoir conduit that are fluidly parallel to one another for a length, the reservoir conduit fluidly rejoining the supply conduit at a junction, the supply conduit fluidly connected to the inlet, the junction upstream of the inlet, and the reservoir conduit including a flow restrictor upstream from the junction; and
a main pump fluidly connected to the supply line and configured to supply a lubricant to the bearing compartment through the supply line and supply and reservoir conduits in an operating state, the main pump having a non-operating state in which the reservoir conduit is configured to more slowly refill the supply conduit through the flow restrictor with the reservoir conduit than the lubricant can evacuate from the supply conduit.

2. The gas turbine engine according to claim 1, comprising a reservoir and a scavenger pump, wherein the bearing compartment includes an outlet, and the scavenger pump is fluidly connected to the reservoir and the outlet respectively by a return line and a scavenge line.

3. The gas turbine engine according to claim 2, wherein the inlet and the outlet are respectively provided on high and low pressure sides, and a lubricant pressure differential between the high and low pressure sides is configured to evacuate the supply conduit with the main pump in the non-operating state.

4. The gas turbine engine according to claim 1, comprising an anti-siphon line fluidly interconnected to the supply line and the reservoir, and a flow restriction separating the anti-siphon line from the supply line.

5. The gas turbine engine according to claim 1, wherein the supply conduit includes a U-shaped portion gravitationally below the junction in a normal engine operating condition.

6. The gas turbine engine according to claim 5, wherein the U-shaped portion includes a flow meter downstream from the junction.

7. The gas turbine engine according to claim 5, wherein the U-shaped portion is gravitationally below the bearing compartment in the normal engine operating condition.

8. The gas turbine engine according to claim 5, wherein the U-shaped portion includes legs that are filled by the reservoir conduit with the main pump in the non-operating condition.

9. The gas turbine engine according to claim 5, wherein the reservoir conduit is gravitationally above the junction in the normal engine operating condition.

10. The gas turbine engine according to claim 5, wherein the supply split into the supply and reservoir conduits is gravitationally above the junction in the normal engine operating condition.

11. The gas turbine engine according to claim 5, comprising a reservoir, wherein the main pump is gravitationally below the U-shaped portion and the reservoir in the normal engine operating condition.

12. The gas turbine engine according to claim 1, wherein the bearing compartment is a first bearing compartment, the inlet is a first inlet, the supply and reservoir conduits are first supply and reservoir conduits, the length is a first length, the junction is a first junction, the flow restrictor is a first flow restrictor; and comprising:
a second bearing compartment having a second inlet;
the supply line splits into a second supply conduit and a second reservoir conduit that are fluidly parallel to one another for a second length, the second reservoir conduit fluidly rejoining the second supply conduit at a second junction, the second supply conduit fluidly connected to the second inlet, and the second reservoir conduit including a second flow restrictor upstream from the second junction; and
a main pump configured to supply a lubricant to the second bearing compartment through the supply line and second supply and reservoir conduits in an operating state, the second reservoir conduit is configured to slowly refill the second supply conduit through the second flow restrictor with the main pump in the non-operating state.

13. A gas turbine engine comprising:
a bearing compartment having an inlet and an outlet;
a reservoir;
a supply line that splits into a supply conduit and a reservoir conduit that are fluidly parallel to one another for a length, the reservoir conduit fluidly rejoining the supply conduit at a junction, the supply conduit fluidly connected to the inlet, and the reservoir conduit including a flow restrictor upstream from the junction;
an anti-siphon line fluidly interconnected to the supply line and the reservoir, and a flow restriction separating the anti-siphon line from the supply line;
a main pump fluidly connected to the supply line and configured to supply a lubricant to the bearing compartment through the supply line and supply and reservoir conduits in an operating state, the main pump having a non-operating state in which the reservoir conduit is configured to more slowly refill the supply conduit through the flow restrictor with the reservoir conduit than the lubricant can evacuate from the supply conduit, the inlet and the outlet are respectively provided on high and low pressure sides, and a lubricant pressure differential between the high and low pressure sides is configured to evacuate the supply conduit with the main pump in the non-operating state;
a scavenger pump fluidly connected to the reservoir and the outlet respectively by a return line and a scavenge line; and
wherein the supply conduit includes a U-shaped portion gravitationally below the junction in a normal engine operating condition, the U-shaped portion includes a flow meter downstream from the junction, the U-shaped portion is gravitationally below the bearing compartment in the normal engine operating condition, the U-shaped portion includes legs that are filled by the reservoir conduit with the main pump in the non-operating condition, the reservoir conduit is gravitationally above the junction in the normal engine operating condition, the supply split into the supply and reservoir conduits is gravitationally above the junction in the normal engine operating condition, and the main pump is gravitationally below the U-shaped portion and the reservoir in the normal engine operating condition.

* * * * *